United States Patent [19]
Cannizzo et al.

[11] Patent Number: 5,523,517
[45] Date of Patent: Jun. 4, 1996

[54] DESTRUCTION OF NITRAMINES EMPLOYING AQUEOUS DISPERSIONS OF METAL POWDERS

[75] Inventors: Louis F. Cannizzo, Ogden; Lewis R. Huntsman, Willard, both of Utah

[73] Assignee: Thiokol Corporation, Ogden, Utah

[21] Appl. No.: 386,152

[22] Filed: Feb. 9, 1995

[51] Int. Cl.$^6$ ..................................................... A62D 3/00
[52] U.S. Cl. .......................................... 588/203; 149/124
[58] Field of Search .................................... 588/203, 244; 149/124

[56] References Cited

U.S. PATENT DOCUMENTS

| | | | |
|---|---|---|---|
| Re. 34,419 | 10/1993 | Melvin et al. | 149/109.6 |
| 4,098,627 | 7/1978 | Tompa et al. | 149/109.6 |
| 4,389,265 | 6/1983 | Tompa et al. | 149/109.6 |
| 4,425,170 | 1/1984 | Jones | 149/109.6 |
| 4,430,132 | 2/1984 | Painter | 149/109.6 |
| 4,661,179 | 4/1987 | Hunter et al. | 149/124 |
| 5,032,291 | 7/1991 | Sublette | 210/757 |
| 5,284,995 | 2/1994 | Melvin | 588/203 |

OTHER PUBLICATIONS

Kenneth L. Rinehart, Jr., *Oxidation and Reduction of Organic Compounds*, pp. 123–142, Chpt. 8, (date unknown).
Buntain et al., *Destruction of Waste Energetic Materials Using Base Hydrolysis*, Los Alamos National Laboratory, May 3–7, 1993.

*Primary Examiner*—Ngoclan Mai
*Attorney, Agent, or Firm*—Ronald L. Lyons; Madson & Metcalf

[57] ABSTRACT

A process of degrading nitramines by mixing the nitramine with an aqueous dispersion of metal powders and by heating the mixture is disclosed. HMX and RDX are typical nitramines which are degraded according to the present invention. Metal powders which have been successfully used include aluminum and zinc. The weight ratio of nitramine to metal powder is less than about 17:1. The aqueous mixture of nitramine and metal powder is preferably heated to a temperature greater than about 50° C. and up to the boiling point of the mixture. Best results have been obtained when an aqueous base is used in connection with the metal powder. Aqueous ammonia and dilute hydroxide salt solutions are currently preferred aqueous base solutions.

20 Claims, No Drawings

DESTRUCTION OF NITRAMINES EMPLOYING AQUEOUS DISPERSIONS OF METAL POWDERS

FIELD OF THE INVENTION

The present invention relates to the destruction of nitramines, such as HMX and RDX, from demilitarized propellants, explosives, and pyrotechnics into non-energetic materials.

BACKGROUND OF INVENTION

Due to demilitarization activities in the United States, Europe, and the former Soviet Union, there are large amounts of waste propellants, explosives, and pyrotechnics (PEP) that need to be dealt with. Traditionally, these materials have been disposed of by open burning/open detonation (OB/OD). Because of environmental concerns and treaty obligations, OB/OD may be discontinued in the near future. Incineration of PEPs is also problematic because of permitting difficulties. A clear need exists for environmentally acceptable alternative technologies for disposing of waste energetic materials.

It is known that high explosives are often unstable in strong base. As a result, it has been proposed to use hot (60° C. to 150° C.) concentrated sodium hydroxide or ammonia to hydrolyze PEPs (T. Spontarelli, et al., "Destruction of Waste Energetic Materials Using Base Hydrolysis," 1993 Incineration Conference, Knoxville, Tenn., May 3–7, 1993). It was determined that RDX (1,3,5-trinitro-1,3,5-triaza-cyclohexane) and HMX (1,3,5,7-tetranitro-1,3,5,7-tetraaza-cyclooctane) consumed three and four moles, respectively, of sodium hydroxide per mole hydrolyzed.

Although concentrated sodium hydroxide effectively degrades nitramines according to the procedure of Spontarelli et al., it would be a significant advancement in the art to use much less caustic materials to degrade nitramines. For instance, metal tooling, parts, and containers often become contaminated with nitramines. Strong caustic solutions tend to corrode and damage metal articles. Therefore, there is a need for effective processes of degrading nitramines which utilize milder conditions.

It would be a further advancement in the art to provide rapid and environmentally acceptable processes of degrading waste nitramines into non-energetic forms.

Such methods of destroying nitramines are disclosed and claimed herein.

SUMMARY OF THE INVENTION

The present invention is directed to a process of degrading nitramines by mixing the nitramine with an aqueous dispersion of metal powders and by heating the mixture. HMX and RDX are typical nitramines which are degraded according to the present invention. Other nitramines, such as nitroguanidine, ethylenedinitramine, methylene dinitramine, and mixtures and salts thereof may also be degraded according to the method of the present invention. Suitable metal powders preferably do not react rapidly with water. Metal powders which have been successfully used include aluminum and zinc. Other metals with similar reduction potentials, such as manganese and magnesium, may also be used herein. The weight ratio of nitramine to metal powder is preferably less than about 17:1. Higher amounts of metal powder can be used. The upper metal powder concentration will be limited by economic considerations. The weight ratio of nitramine to metal powder is more preferably less than 5:1 and most preferably about 1:1. The aqueous mixture of nitramine and metal powder is preferably heated to a temperature greater than about 50° C. and up to the boiling point of the mixture. Best results have been obtained when an aqueous base is used in connection with the metal powder. Aqueous ammonia and dilute hydroxide salt solutions are currently preferred aqueous base solutions.

The nitramine is degraded into non-energetic products such as nitrite salts, formate salts, formaldehyde, and nitrous oxide. The present invention provides an effective process of degrading nitramines under mild, non-caustic conditions.

DETAILED DESCRIPTION OF THE INVENTION

The present invention is directed to a process of degrading nitramines, such as HMX, RDX, nitroguanidine, ethylenedinitramine, and methylene dinitramine, and salts thereof, with an aqueous dispersion of metal powders. In a series of experiments, the rapid destruction of HMX and RDX was accomplished using aqueous dispersions of metal powders. Suitable metal powders preferably do not react rapidly with water. Preferred metal powders include aluminum, zinc, manganese, and magnesium. The metal powder particle size preferably ranges from 5 μ to 840 μ, more preferably, the particle size ranges from 30 μ to 60 μ. The weight ratio of nitramine to metal powder is preferably less than about 17:1. Higher amounts of metal powder can be used. The upper metal powder concentration will be limited by economic considerations. The weight ratio of nitramine to metal powder is more preferably less than 5:1. Good results have been obtained with a 1:1 mixture of nitramine to metal powder.

Best results are obtained when metal powders are used in combination with an aqueous base. Aqueous ammonia and dilute hydroxide salt solutions are currently preferred aqueous base solutions. The dilute hydroxide salt solution, when added to the aqueous metal powder, typically produces a hydroxide concentration in the solution mixture in the range from about 0.0001M to about 0.01M. Water soluble lower alkyl organic amines may also be used instead of ammonia. Other aqueous base solutions which may be used include, for example, sodium sulfide, sodium carbonate, and other suitable aqueous base solutions which apparently assist in the reduction of the nitramine by the metal powder. Typical degradation products resulting from the nitramine degradation include hydrogen, nitrogen, ammonia, nitrite salts, formate salts, formaldehyde, nitrous oxide, and polymeric resins. Hexamine may also result if ammonia is used as the aqueous base.

Without being bound by theory, it is currently believed that the combination of aqueous metal and aqueous base causes degradation of nitramines according to the following mechanism:

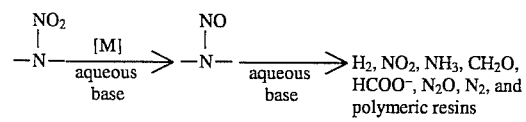

For HMX, the best rate was achieved using the combination of zinc powder and aqueous ammonia at 90° C. NMR analysis of the solid residue remaining after treatment of a 1:1 mixture of HMX and zinc powder with aqueous ammonia at 90° C. for one hour indicated that only 0.04% of the original amount of HMX remained. Thus, 99.6% destruction of HMX was obtained.

Under the same conditions (aqueous ammonia, 90° C.), a 1:1 mixture of HMX and 30 μ aluminum powder was treated for six hours. After this time period, less than 3% of the original HMX remained by NMR analysis (over 97% destruction of HMX).

Additionally, it was found that treatment of a 1:1 mixture of HMX and 30 μ aluminum powder in water (with no ammonia present) for 23 hours at 90° C. resulted in destruction of 47% of the HMX originally present.

In contrast, treatment of HMX with aqueous ammonia in the absence of a metal powder at 90° C. for 23 hours resulted in destruction of 45% of the HMX originally present.

The reactions involving HMX/aluminum powder/aqueous ammonia and HMX/zinc powder/aqueous ammonia were repeated by substituting sodium hydroxide (NaOH) for the ammonia. This was achieved by periodically adding small amounts of sodium hydroxide during the reaction. After 23 hours at 90° C., 50% of the HMX present was destroyed in the experiment with aluminum powder and sodium hydroxide, and 25% of the HMX was destroyed in the experiment with zinc powder and sodium hydroxide. For the experiment with aluminum, only 0.13 molar equivalents of NaOH per mole of HMX destroyed was employed while for the experiment with zinc powder only 0.25 molar equivalents of NaOH per mole of HMX destroyed was used. Normally 4 molar equivalents of NaOH are required to destroy HMX according to prior art teachings (T. Spontarelli, et al., "Destruction of Waste Energetic Materials Using Base Hydrolysis," 1993 Incineration Conference, Knoxville, Tenn., May 3–7, page 2, 1993).

It was found that treatment of RDX with an equal weight of 30 μ aluminum powder in aqueous ammonia at 90° C. resulted in 98% destruction of the RDX originally present. In contrast, treatment of RDX with aqueous ammonia alone at 90° C. for 3 hours resulted in destruction of 95% of the RDX originally present.

The following examples are offered to further illustrate the present invention. These examples are intended to be purely exemplary and should not be viewed as a limitation on any claimed embodiment.

EXAMPLE 1

In this example, HMX was degraded with an aqueous dispersion of aluminum powder and ammonia. In a 1000 ml, 3 necked round bottom flask with stir bar, thermometer, condenser, and $NH_3$ diffusion tube was added 7 g HMX, 7 g 30 μ aluminum powder and 10 ml water. The mixture was heated to 90° C. Ammonia ($NH_3$) was bubbled through the mixture causing the mixture to foam. After about 25 hours, the solids present in the mixture were examined by NMR and found to contain 18% by weight HMX. The sides of the flask were washed, the diffusion tube was cleaned, and $NH_3$ was diffused again through the mixture. After a total of 30.5 hours, the solids present in the mixture were examined by NMR and found to contain 0.18% by weight HMX. After a total of 46.5 hours, the overall mixture was examined by NMR and found to contain no HMX.

EXAMPLE 2

In this example, HMX was degraded with an aqueous dispersion of aluminum powder and ammonia. In a 250 ml, 3 necked round bottom flask with stir bar, thermometer, condenser, and needle for $NH_3$ diffusion was added 3 g HMX, 3 g 30 μ aluminum powder, and 90 ml water. The mixture was heated to 90° C. Ammonia ($NH_3$) was bubbled through the mixture causing the mixture to foam. Solids were rinsed off sides of the flask every 20 to 30 minutes. After 6 hours, the solids in the mixture were examined by NMR and found to contain 1.2% by weight HMX. The mixture was allowed to react overnight, and after 22.5 hours the mixture was examined by NMR and found to contain 0.4% of the original HMX.

EXAMPLE 3

In this example, HMX was degraded with an aqueous dispersion of zinc powder and ammonia. In a 250 ml, 3 necked round bottom flask with stir bar, thermometer, condenser, and needle for $NH_3$ diffusion was added 3 g HMX, 3 g zinc powder, and 90 ml water. The mixture was heated to 90° C. Ammonia ($NH_3$) was bubbled through the mixture causing the mixture to foam. After 1 hour, the mixture was examined by NMR and found to contain only 0.04% of the original amount of HMX.

EXAMPLE 4

In this example, HMX was degraded with an aqueous dispersion of aluminum powder. In a 250 ml, 3 necked round bottom flask with stir bar, thermometer, and condenser was added 3 g HMX, 3 g 30 μ aluminum powder, and 90 ml water. The mixture was heated to 90° C and some foaming was observed. Solids were rinsed off sides of the flask every 15 to 20 minutes. The mixture was allowed to react overnight, and after about 24 hours the mixture was examined by NMR and found to contain 53% of the original HMX.

EXAMPLE 5

In this example, RDX was degraded with an aqueous solution of ammonia. In a 250 ml, 3 necked round bottom flask with stir bar, thermometer, condenser, and needle for $NH_3$ diffusion was added 3 g RDX and 90 ml water. The mixture was heated to 90° C. Ammonia ($NH_3$) was bubbled through the mixture causing the mixture to lightly foam. Solids were rinsed off sides of the flask every 30 minutes. After 3.5 hours, the mixture was examined by NMR and found to contain about 5% of the original RDX.

EXAMPLE 6

In this example, HMX was degraded with an aqueous dispersion of zinc powder. In a 250 ml, 3 necked round bottom flask with stir bar, thermometer, and condenser was added 3 g HMX, 3 g zinc powder, and 90 ml water. The mixture was heated to 90° C. No foaming was observed. After about 4 hours, the solids in the mixture were examined by NMR and found to contain 52% by weight HMX. The mixture was allowed to react overnight, and after about 23 hours the mixture was examined by NMR and found to contain 67% of the original HMX.

EXAMPLE 7

In this example, HMX was degraded with an aqueous dispersion of zinc powder and sodium hydroxide. In a 250 ml, 3 necked round bottom flask with stir bar, thermometer, and condenser was added 3 g HMX, 3 g zinc powder, and 90 ml water. The mixture was heated to 90° C with stirring. 1.0 ml of 0.09M NaOH was added to the solution (resulting in a hydroxide concentration of approximately 0.001M), and no foaming was observed. After 1 hour, the solids present in the mixture were examined by NMR and found to contain 53% by weight HMX. 1.0 ml of 0.09M NaOH was added every hour for six hours. The mixture was allowed to react overnight (23 hours total reaction time). The mixture was examined by NMR and found to contain 75% of the original HMX. Only 0.25 molar equivalents of NaOH, compared to the moles of HMX destroyed, were used.

EXAMPLE 8

In this example, RDX was degraded with an aqueous dispersion of aluminum powder and ammonia. In a 250 ml, 3 necked round bottom flask with stir bar, thermometer, condenser, and needle for $NH_3$ diffusion was added 3 g RDX, 3 g 30 μ aluminum powder, and 90 ml water. The mixture was heated to 90° C. Ammonia ($NH_3$) was bubbled through the mixture. After 3 hours, the mixture was examined by NMR and found to contain about 1.8% of the original RDX.

EXAMPLE 9

In this example, HMX was degraded with an aqueous dispersion of aluminum powder and sodium hydroxide. In a 250 ml, 3 necked round bottom flask with stir bar, thermometer, and condenser was added 3 g HMX, 3 g 30 μ aluminum powder, and 90 ml water. The mixture was heated to 90° C., and foaming was observed. Solids were rinsed off sides of the flask, and 1.0 ml of 0.09M NaOH was added to the solution (resulting in a hydroxide concentration of approximately 0.001M). Foaming continued. After 1 hour, solids were rinsed off sides of the flask, and 1.0 ml of 0.09M NaOH was added. After two hours, solids were rinsed off sides of the flask and examined by NMR and found to contain 18% by weight HMX. 1.0 ml of 0.09M NaOH was added every hour for five more hours. The mixture was allowed to react overnight (23 hours total reaction time). The mixture was examined by NMR and found to contain 50% of the original HMX. Only 0.13 molar equivalents of NaOH, compared to the moles of HMX destroyed, were used.

From the foregoing, it will be appreciated that the present invention provides a process of degrading nitramines which do not require caustic materials. The present invention further provides rapid and environmentally acceptable processes of degrading waste nitramines into non-energetic forms.

The present invention may be embodied in other specific forms without departing from its essential characteristics. The described embodiments are to be considered in all respects only as illustrative and not restrictive. The scope of the invention is, therefore, indicated by the appended claims rather than by the foregoing description.

The claimed invention is:

1. A method of degrading nitramines comprising the following steps:
   (a) mixing a nitramine, a metal powder, and water to obtain an aqueous mixture of said nitramine and said metal powder, said metal powder being selected from aluminum, zinc, manganese, and magnesium; and
   (b) heating the aqueous mixture to a temperature greater than about 50° C.

2. A method of degrading nitramines as defined in claim 1, wherein the nitramine is HMX.

3. A method of degrading nitramines as defined in claim 1, wherein the nitramine is selected from RDX, nitroguanidine, ethylenedinitramine, methylene dinitramine, and mixtures and salts thereof.

4. A method of degrading nitramines as defined in claim 1, wherein the weight ratio of nitramine to metal powder is less than about 17:1.

5. A method of degrading nitramines as defined in claim 1, wherein the weight ratio of nitramine to metal powder is less than about 5:1.

6. A method of degrading nitramines as defined in claim 1, wherein the weight ratio of nitramine to metal powder is about 1:1.

7. A method of degrading nitramines as defined in claim 1, wherein the aqueous mixture of nitramine and metal powder further comprises an aqueous base.

8. A method of degrading nitramines as defined in claim 7, wherein the aqueous base is aqueous ammonia.

9. A method of degrading nitramines as defined in claim 7, wherein the aqueous base is a dilute hydroxide salt solution.

10. A method of degrading nitramines as defined in claim 1, wherein the mixture is heated to its boiling point.

11. A method of degrading nitramines comprising the following steps:
    (a) mixing a nitramine, a metal powder, and an aqueous base to obtain a mixture of said nitramine, said metal powder, and said aqueous base, said metal powder being selected from aluminum and zinc, and wherein the weight ratio of nitramine to metal powder is less than 17:1; and
    (b) heating the mixture to a temperature greater than about 50° C.

12. A method of degrading nitramines as defined in claim 11, wherein the aqueous base is aqueous ammonia.

13. A method of degrading nitramines as defined in claim 11, wherein the aqueous base is a dilute hydroxide salt solution.

14. A method of degrading nitramines as defined in claim 11, wherein the nitramine is HMX.

15. A method of degrading nitramines as defined in claim 11, wherein the nitramine is RDX.

16. A method of degrading nitramines as defined in claim 11, wherein the aqueous base is aqueous ammonia, the metal powder is zinc, and the nitramine is HMX.

17. A method of degrading nitramines as defined in claim 11, wherein the aqueous base is aqueous ammonia, the metal powder is aluminum, and the nitramine is HMX.

18. A method of degrading nitramines as defined in claim 11, wherein the mixture is heated to its boiling point.

19. A method of degrading nitramines as defined in claim 11, wherein the weight ratio of nitramine to metal powder is less than about 5:1.

20. A method of degrading nitramines as defined in claim 11, wherein the weight ratio of nitramine to metal power is about 1:1.

* * * * *